US011049524B1

(12) United States Patent
Beiro et al.

(10) Patent No.: US 11,049,524 B1
(45) Date of Patent: Jun. 29, 2021

(54) INTERRELATED ENTERTAINMENT DEVICES FOR MUSIC AND RELATED INFORMATION

(71) Applicant: Karen Schneider, Orlando, FL (US)

(72) Inventors: Edgardo Antonio Mirand Beiro, Orlando, FL (US); Mark Richard Schneider, Orlando, FL (US); Chase Schneider, Orlando, FL (US)

( * ) Notice: Subject to any disclaimer, the term of this patent is extended or adjusted under 35 U.S.C. 154(b) by 0 days.

(21) Appl. No.: 16/746,851

(22) Filed: Jan. 18, 2020

Related U.S. Application Data

(63) Continuation-in-part of application No. 16/055,042, filed on Aug. 4, 2018, now Pat. No. 10,613,580.

(51) Int. Cl.
| G11B 27/10 | (2006.01) |
| H04R 1/02 | (2006.01) |
| G06F 3/16 | (2006.01) |
| G11B 33/02 | (2006.01) |
| G11B 33/04 | (2006.01) |
| H04N 5/64 | (2006.01) |
| H04R 3/00 | (2006.01) |

(52) U.S. Cl.
CPC .............. *G11B 27/10* (2013.01); *G06F 3/162* (2013.01); *G11B 33/022* (2013.01); *G11B 33/04* (2013.01); *H04N 5/64* (2013.01); *H04R 1/028* (2013.01); *H04R 3/00* (2013.01); *H04R 2420/07* (2013.01)

(58) Field of Classification Search
CPC ...................................................... G06F 12/00
See application file for complete search history.

(56) References Cited

U.S. PATENT DOCUMENTS

| 7,537,169 | B2 * | 5/2009 | Gonzalez | G06K 19/077 |
| | | | | 235/380 |
| 8,934,226 | B2 | 1/2015 | Smith | |
| 9,578,384 | B2 | 2/2017 | Selim et al. | |
| 2007/0094439 | A1 * | 4/2007 | Kumar | G06F 9/4401 |
| | | | | 711/103 |
| 2014/0282071 | A1 | 9/2014 | Trachtenberg et al. | |
| 2015/0070340 | A1 | 3/2015 | Trachtenberg et al. | |

OTHER PUBLICATIONS

Digital Photo Frame, www.amazon.com/digital-electronics-picture, 8 pages, amazon web site, 2017.

* cited by examiner

*Primary Examiner* — Jerry Wu
(74) *Attorney, Agent, or Firm* — Brian S. Steinberger; Hilary F. Steinberger; Law Offices of Brian S. Steinberger, P.A.

(57) ABSTRACT

The present invention provides devices for presenting entertainment by obtaining from a selected artist video and audio data regarding the artist's work and placing the data on a portable storage device for use in an entertainment device. After uploading the data into the entertainment frame's controller, the user selects one or more presentations by the artist to be played on the entertainment device. The entertainment device comprises a picture frame being mounted on a vertical surface with a display screen in the picture frame. The frame has a rechargeable battery for operating a controller that accepts an input device with a selected artist's video and audio data. The audio and video are played on the screen to provide entertainment from a singer or painter. Further, the entertainment device may be modular and removable from the picture frame so as to be transported easily to other locations, or the input device may be an flash album device.

13 Claims, 12 Drawing Sheets

INTERRELATED ENTERTAINMENT DEVICES FOR MUSIC AND RELATED INFORMATION

CROSS REFERENCES TO RELATED APPLICATIONS

This is a CIP of patent application Ser. No. 16/055,042 filed 4 Aug. 2018 titled "Entertainment Device and Method of Having Coordinated Video and Audio," having one common inventor, Chase Schneider, further, and depends from provisional patent application 62/918,361, filed Jan. 28, 2019, titled, "Interrelated Entertainment Devices for Music and Related Information," by inventors Edgardo Antonio Mirand Beiro, Mark Schneider, and Chase Schneider.

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to entertainment devices, and, in particular, to devices providing video and/or audio, and, in great particularity, to devices providing artist created video and audio products, and devices that may provide such to another device.

Description of the Prior Art

With the availability of numerous digital products, people may want to and desire to obtain customized entertainment.

Several prior art devices can provide both audio and video. U.S. Pat. No. 8,934,226, titled "Mountable Device Having a Pivotable Input Device Support", issued Jun. 13, 2015, by Smith discloses a wall mountable computer system as noted in Col. 11, lines 9 to 42, having both video and audio support through numerous devices including being connected to the Internet. U.S. Pat. No. 9,578,384, entitled Systems and Method for Providing Video on Demand in an Intelligent Television", issued Feb. 21, 2017, by Flextronics discloses a table mounted television having user interface for video-on-demand (VOD) and the use of such. U.S. Patent Application Publication 2014/0282071, titled Systems and Methods for Distributing, Viewing, and Controlling Digital Art and Imaging, published Sep. 18, 2014, by Trachtenberg discloses a frame with a screen as would be provided by a tablet as discussed in paragraphs [0127] to [0129] where an additional controller is attached to the frame. U.S. Patent Application Publication 2015/0070340, entitled "Display Device for Displaying Digital Imaging", published Mar. 12, 2015, by Trachtenberg discloses a vertically mounted display screen with supporting computer system connected via the Internet to the Cloud. Further, a photo frame electronic video/audio player by Amazon supports pictures, videos, and audio and is known to one skilled in the art. Also see Wikipedia as to Bluetooth. These are incorporated by reference.

Accordingly, there is a need for a device and method of providing entertainment by selected artists.

SUMMARY OF THE INVENTION

The present invention provides devices for presenting unique entertainment by obtaining from a selected artist video and/or imagery and audio regarding the artist's work and playing the data of such on one or more entertainment devices. In this regard, the video is a single picture or multiple pictures or movies or any other visual representation as desired by the artist. In one embodiment, the entertainment device has a picture-like frame with a screen therein with a controller therein from which the user selects one or more presentations by the artist to be played on the entertainment device. The entertainment device comprises a picture frame being mounted on a vertical surface or other appropriate surface with a display screen in the picture frame. The picture frame has a rechargeable battery for operating the controller that accepts an input device with a selected artist's video and audio data. The device does not require a direct connection to a power source such as a wall outlet. The device may have a modular device that can play one or both video and audio when removed from the picture frame. The audio and video are played on the screen in the frame or in the modular device to provide entertainment from a singer or painter or other types of artists. The entertainment data may also be provided by a CD-like device called a flash album device which is connected to the entertainment device by Bluetooth, for example. Thus the present invention provides interrelated entertainment devices that are able to share data of video and audio.

In a related embodiment, the above entertainment device may communicate with a wireless network such as with Bluetooth® enabled device such as that noted in the first embodiment or a smart phone, etc. The entertainment device may have also music and video recorded therein which is available to users. The entertainment device has appropriate memory, controller, wireless networking such as Bluetooth, USB input, and power. Although not included, wireless speakers can play the music. The flash album device may be dedicated to a single artist and have therein literature about the artist and other information. The flash album device may be a CD-like holder.

It is an object of the present invention to provide an entertainment device for playing coordinated video and audio from a selected artist.

It is another object of the present invention to provide an entertainment device that can be mounted on almost any vertical surface.

It is a further object of the present invention to provide an entertainment device that is stand-alone and operates with a rechargeable battery as the first embodiment.

It is still a further object of the present invention to provide an entertainment device that can play artist created video and audio such as pictures with a song.

It is still another object of the present invention to provide an entertainment device where the artist may obtain additional profit through sales and use.

It is still another object of the present invention to provide an entertainment device that is modular and may be removed from the picture frame to be transportable.

It is still another object of the present invention to provide a flash album device being like a CD that can communicate with the entertainment device through a Bluetooth network or actually play audio to Bluetooth connected speakers.

It is still another object of the present invention to provide an entertainment device that is modular and may communicate with the first embodiment via a wireless network.

These and other objects, features, and advantages of the present invention will become more readily apparent from the attached drawings and the detailed description of the preferred embodiments, which follow.

BRIEF DESCRIPTION OF THE DRAWINGS

Like reference numerals refer to like parts throughout the several views of the drawings.

DETAILED DESCRIPTION OF THE PREFERRED EMBODIMENTS

The present invention provides a method and devices of presenting unique entertainment by obtaining from a selected artist video and audio regarding the artist's work and playing the data of such on an entertainment device with the assistance of a flash album device. The entertainment device has a picture-like frame with a screen therein with a controller therein from which the user selects one or more presentations by the artist to be played on the entertainment device. The entertainment device comprises a picture frame being mounted on a vertical surface with a display screen in the picture frame. The frame has a rechargeable battery for operating the controller that accepts an input device with a selected artist's video and audio data. The device may have a modular device that can play one or both video and audio when removed from the frame. The audio and video are played on the screen in the frame or in the modular device to provide entertainment from a singer or painter. Further, the artist's information and works may be on a single source such as the flash album device being approximately the size of a CD.

Figure 1:
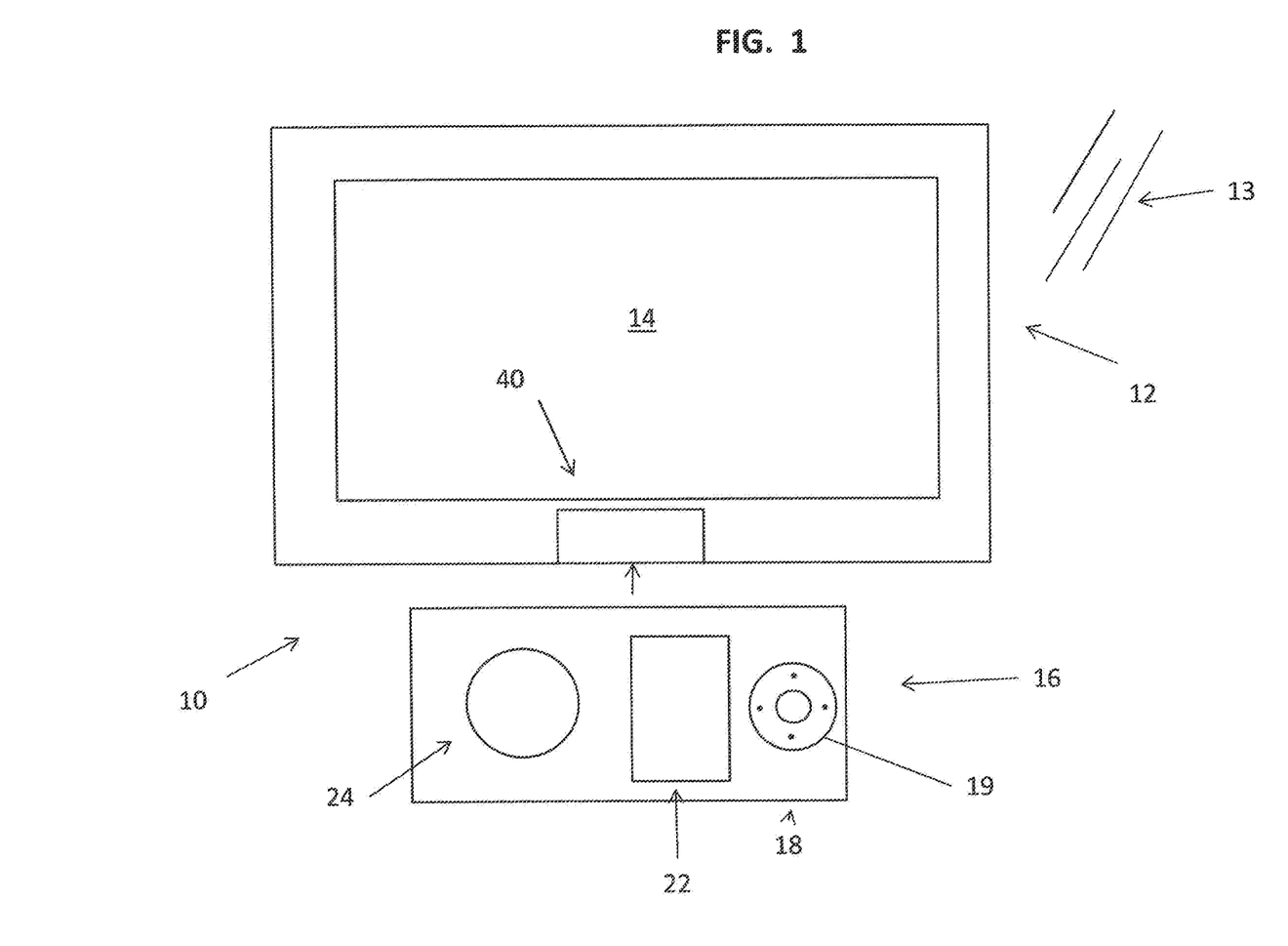
FIG. 1 is a front view of the entertainment device with a snap-in module removed (and enlarged therein) of the present invention.
Figure 3:
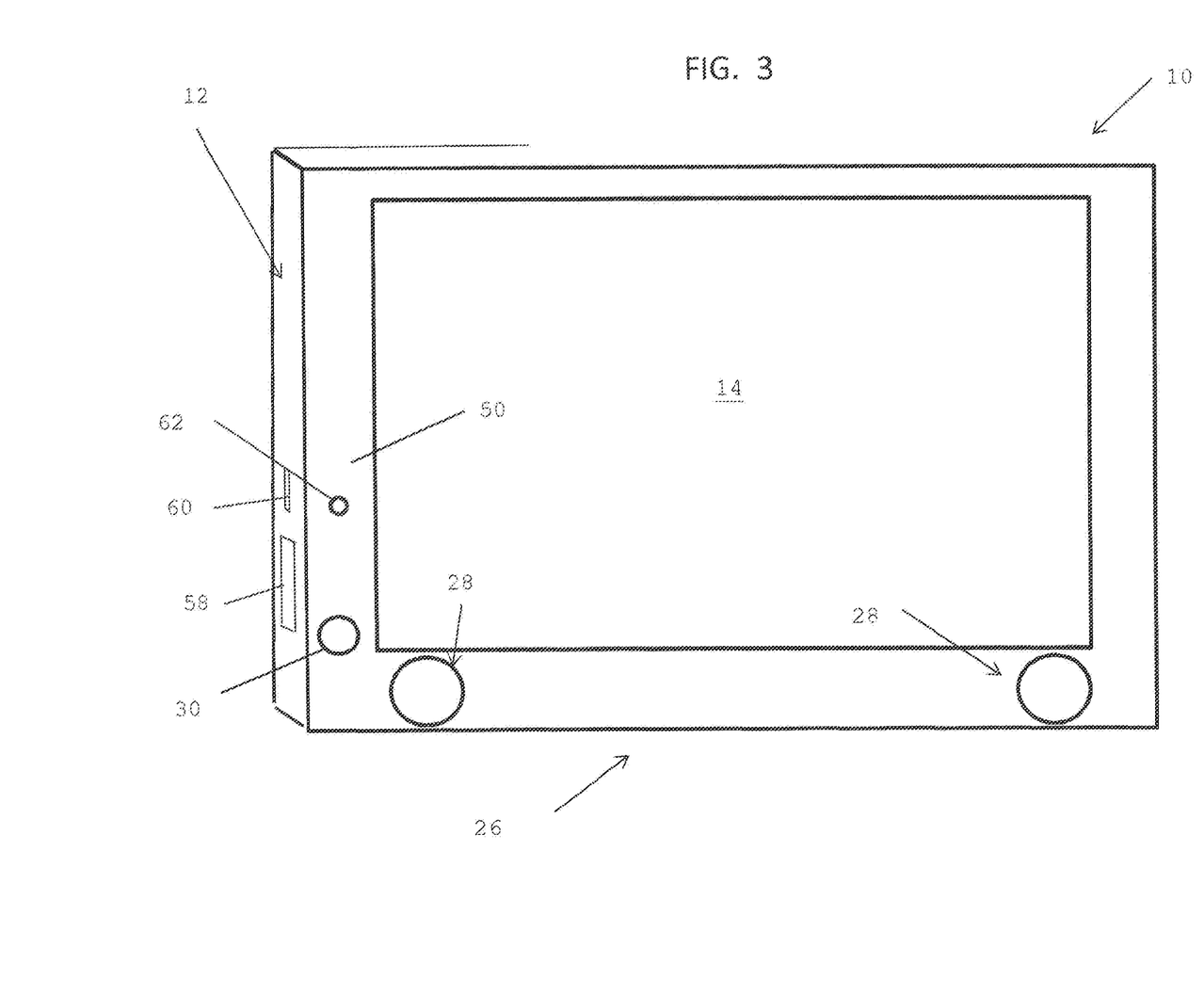
FIG. 3 is a front view of another embodiment of the entertainment frame without a snap-in module of the present invention.
Figure 4:
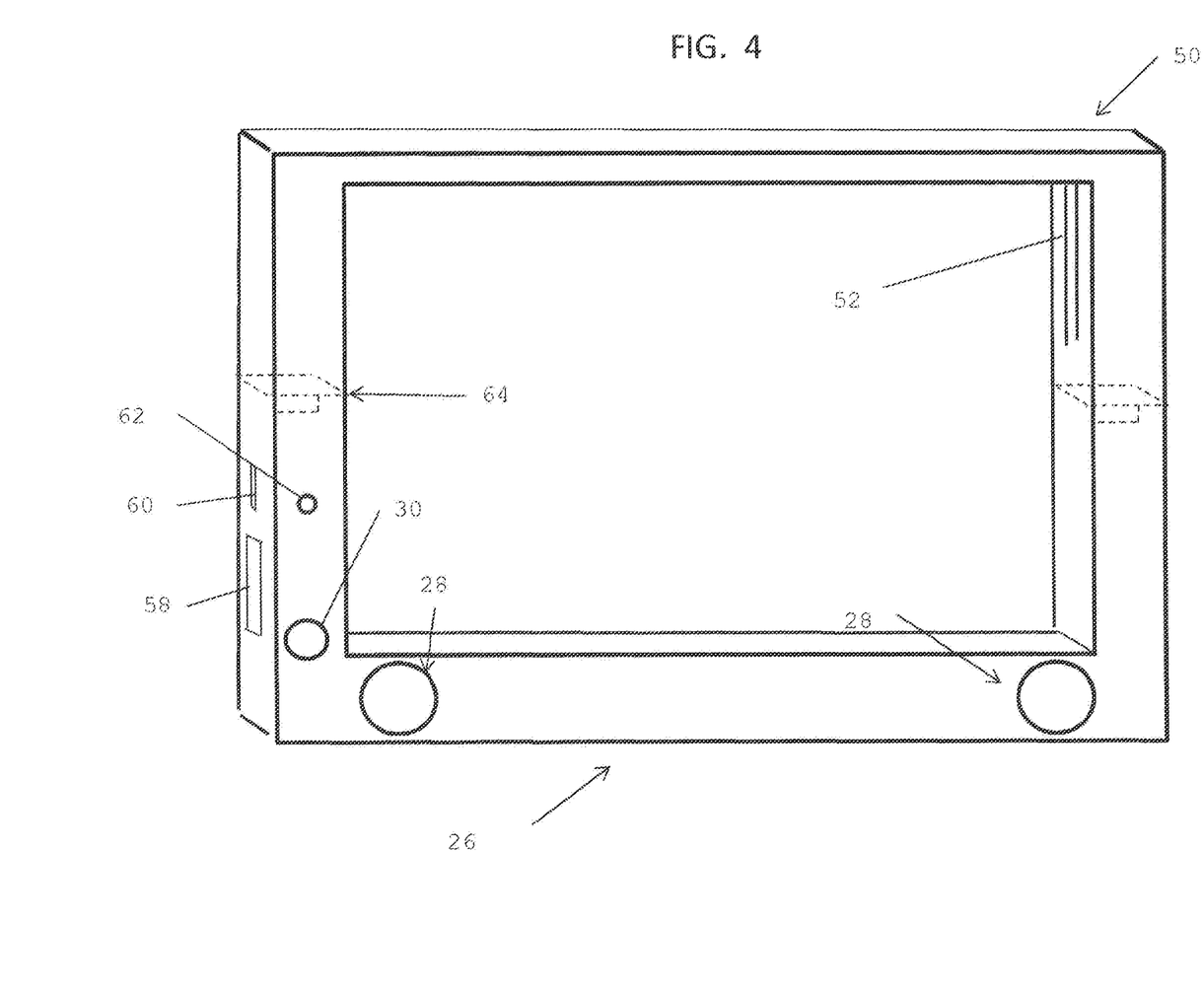
FIG. 4 is a view the same as FIG. 3 showing a separable frame for inserting a screen therein.

FIG. 1 discloses the entertainment device 10 with a picture frame 12 that is mountable to vertical surface such as a wall 13. A display screen 14 is mounted in the picture frame 12. A means for presenting at least one video object such as a single picture or multiple pictures or movies in the picture frame 12 and being mounted within the picture frame 12 is a modular device 16 that may act as a stand-alone device for the display of imagery and associated audio that uses an input device such as a stick memory having video and audio data provided by a selected artist. The stick memory is input into a USB port 18. A source of rechargeable power is integrated into the modular device 16 and can be recharged via a charge port for the means for presenting. A controller 19 controls the display 22 or display 14 or via an app in a smartphone. A speaker 24 is included on the modular device 16 and/or also in the picture frame 26 as stereo speakers 28 as shown in FIGS. 3 and 4. The operating features of the stand-alone device 16 can also be included in the device 10 with controls such as shown in FIG. 3. In this regard, an entertainment device 10 may also be on the wireless network. Referring to FIG. 1, an entertainment device 10 is shown having a picture 14 as well as other information thereon as related to the artist product which may include music and video, pictures and/or movies. A USB connector 70 is hinged to the lid 64 being an optional means for communicating to other devices. The word "communicating" means both sending and receiving information.

Figure 2:
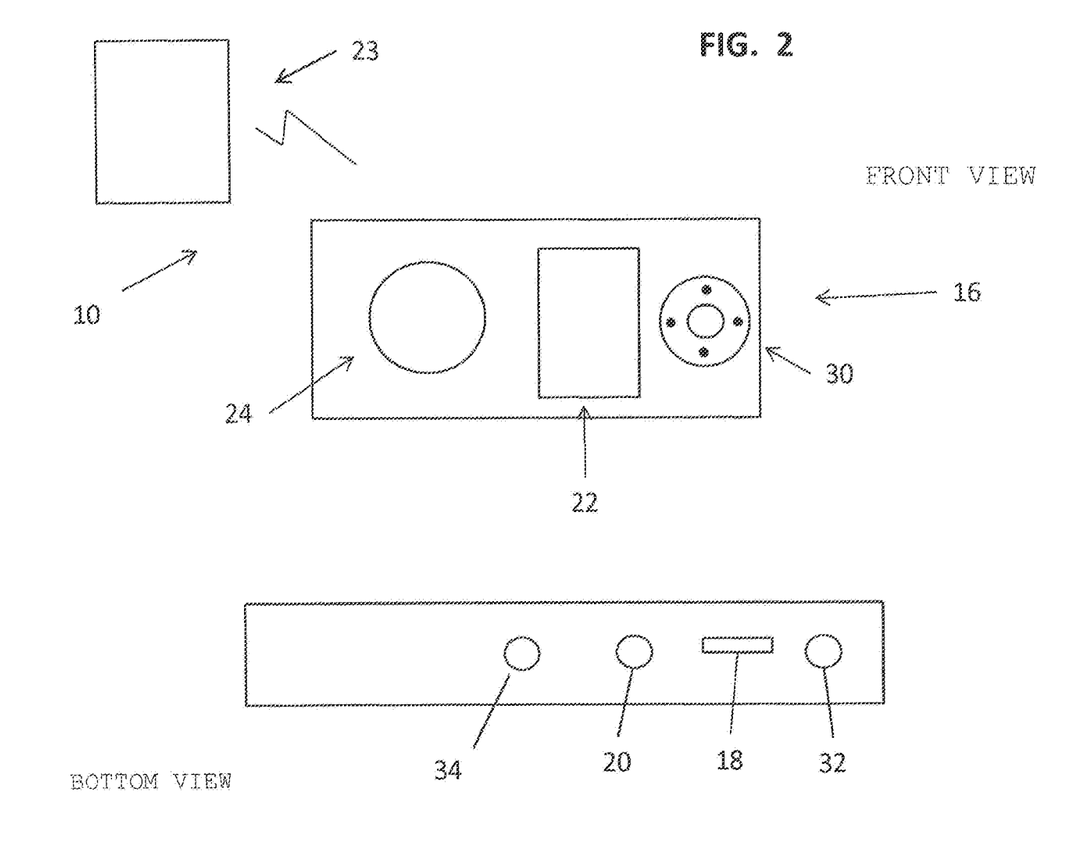
FIG. 2 are further views of FIG. 1 identifying items of the snap-in module.

FIG. 2 further illustrates the modular device 16 to be inserted into port 40 being a snap-in port 40, and the other features on the modular device 16. All of these same features are included in the picture frame 26 as shown in FIGS. 3 and 4. FIG. 3 shows the device 10 without a modular device 16. FIG. 4 shows a separable frame 13. The bottom view of the modular device 16 in FIG. 2 includes an on-off switch 32 that may also act as a Bluetooth switch, a USB port 18, a charging port 20 and an indicator light 34. A Bluetooth function therein can send information to the entertainment device 23.

FIG. 3 shows appropriate controls therein such as speakers 28, a controller 30, an indicator light 62, a USB port 60. FIG. 4 shows the entertainment device 12 with a separate frame 26. The control of such is through controller 27. FIG. 4 illustrates an entertainment device having a separable frame 50 with frame connectors 64 so that a single picture may be inserted therein. A pair of speakers 28 are on the frame. A control button 30 allows for navigation. A battery compartment 58 is on the side of the frame 50 as well as a USB port 60 and a battery indicator light 62. An additional feature for the entertainment device 10 is the use of wireless networks such as Bluetooth in the frame 50, and in the modular device 16.

Figure 5:
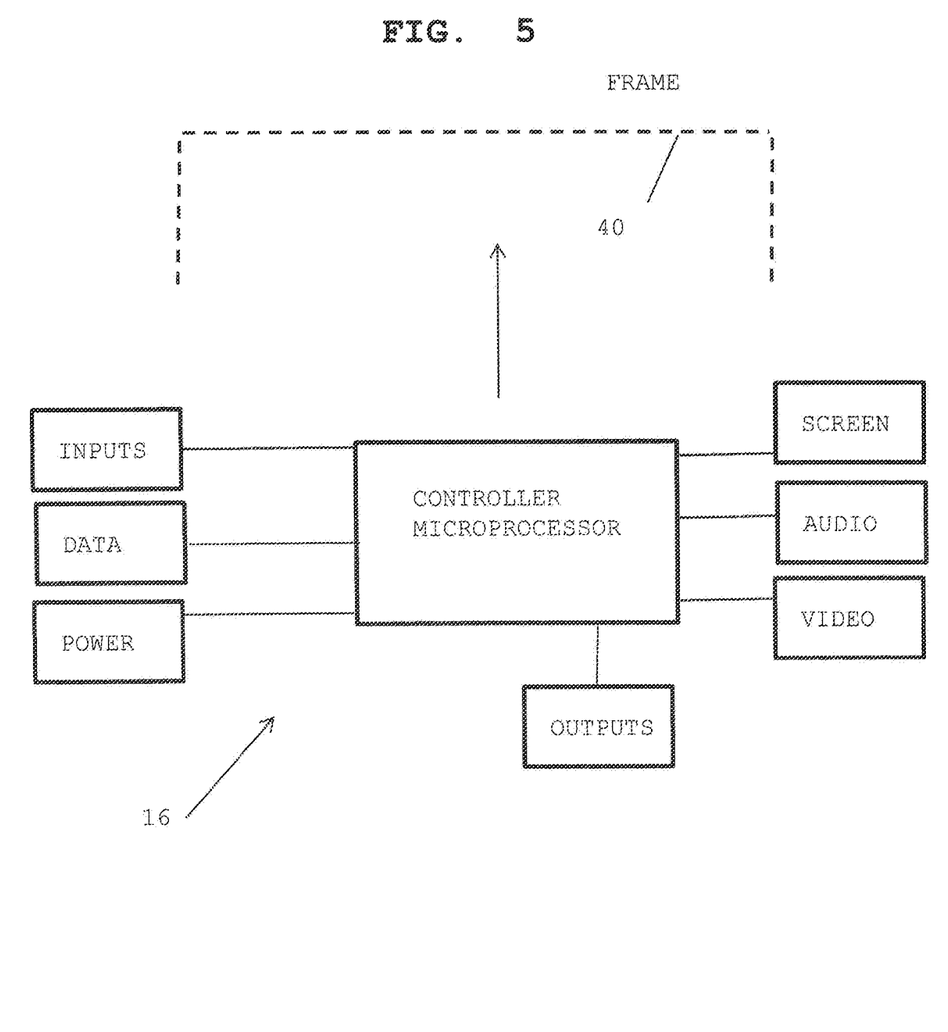
FIG. 5 illustrates the electronic features needed for a stand-alone snap-in module.

FIG. 5 details conventional features of a an operating system that operates the entertainment device 10 having the modular device 16 going into port 40.

Figure 6:
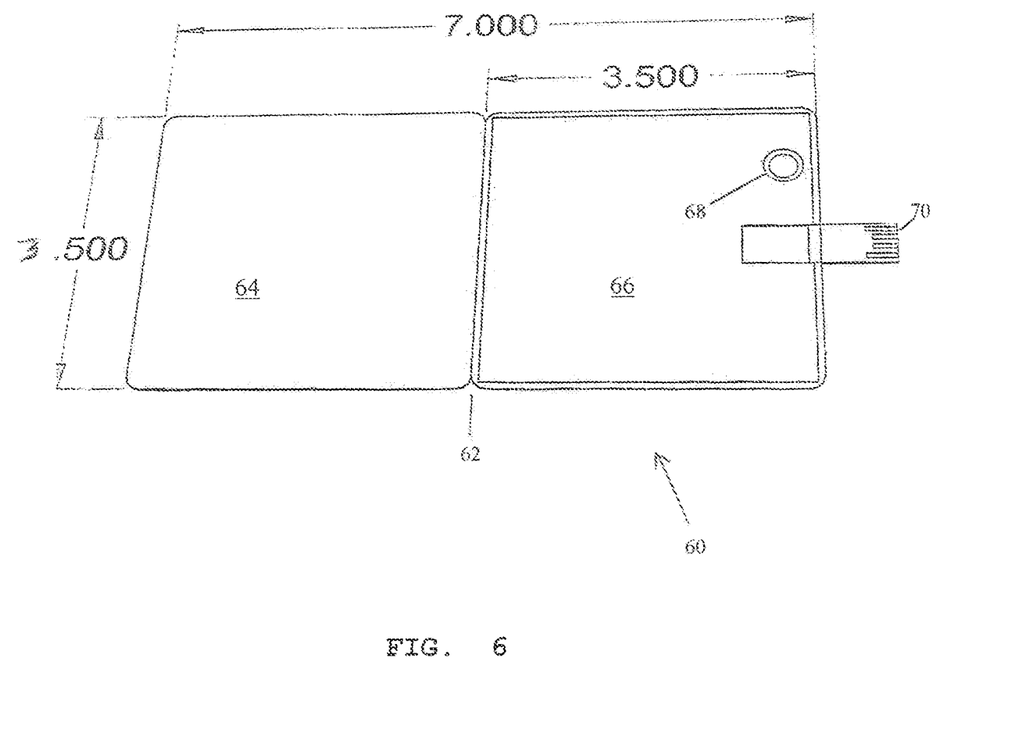
FIG. 6 illustrates a typical flash album device being CD-sized.
Figure 7:
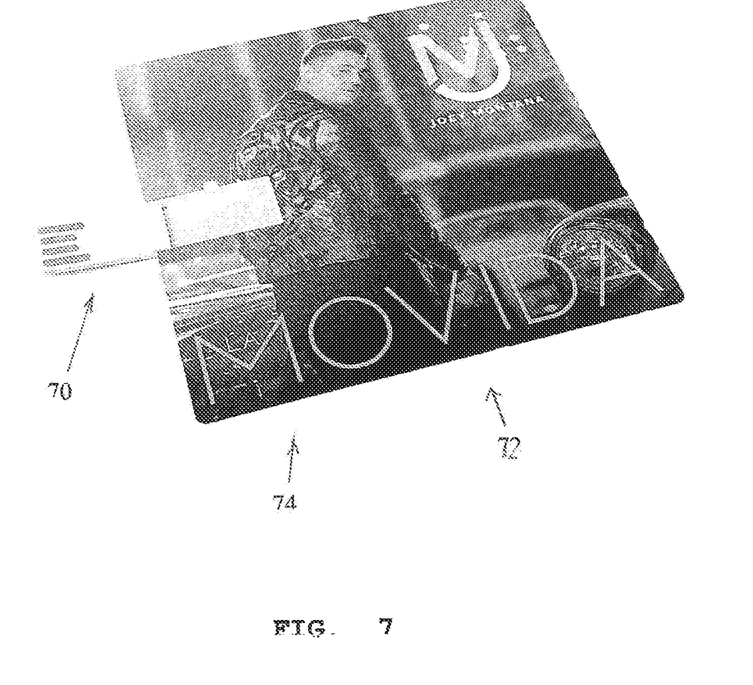
FIG. 7 illustrates a front view perspective of a typical flash album device having an artist thereon and having a connector rotated therefrom.
Figure 8:
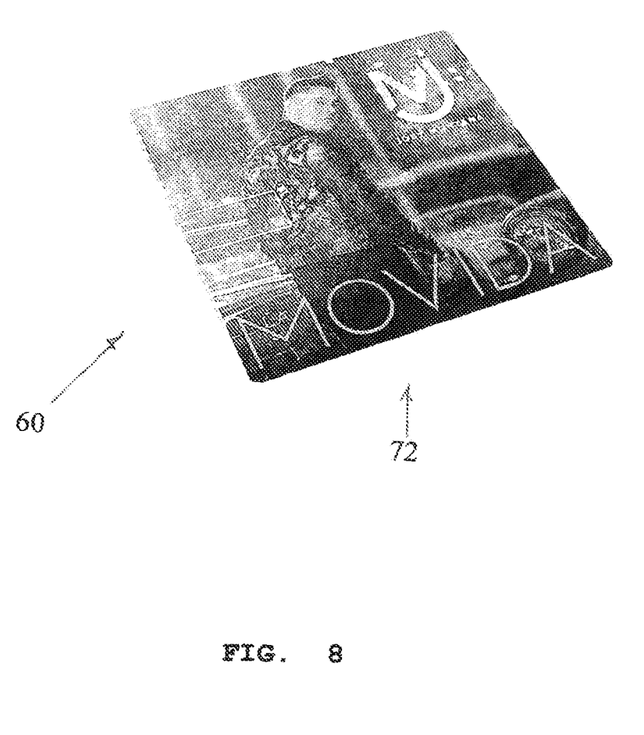
FIG. 8 is similar to FIG. 7 showing the connector in a closed mode.
Figure 9:
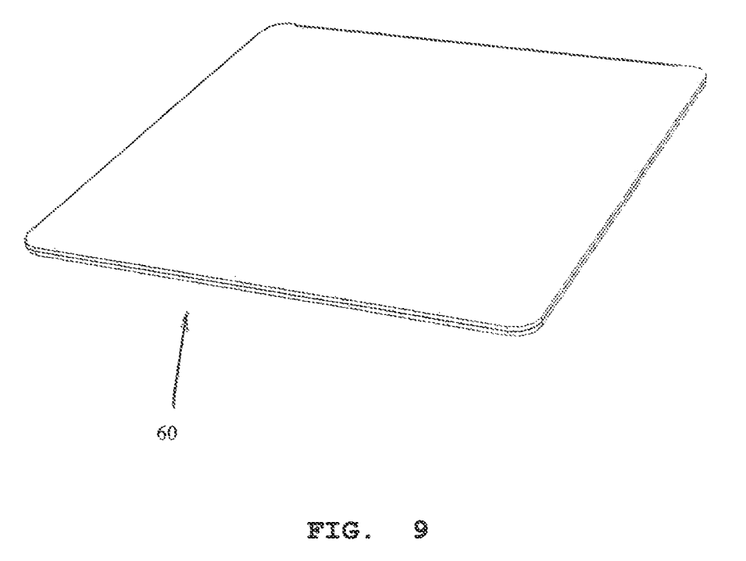
FIG. 9 is the flash album device without identifying information thereon being essentially the same size as a CD container in a closed mode.

FIG. 6 shows a flash album device 60 where selected artists, whether a painter or a singer or an artist provide both digital information having both pictures and/or audios that can be played on the entertainment device 10 or modular device 16. The flash album device 60 is about the size of a conventional CD case being 3.5 inches square with a hinge 62 between a folding lid 64 on a base section 66. FIG. 6. A Bluetooth switch 68 is mounted thereon and a stowable connector 70 is shown in the open mode. The connector 70 is hinged to the base section 66. The connector 70 would be able to connect to a USB port or to a USB device such as a thumb drive. Charging, if needed, can be through the USB connector 70 or a wireless charging system and/or if a charging port. FIG. 7 shows the flash album device 60 in an open mode with the connector 70 extended. FIG. 8 shows the flash album device 60. in a close mode.

The artist's information would be downloaded to the memory therein by a wireless connection. Appropriate advertising could be printed out and attached to the outer lid and also inside of the drive with removable adhesive material. Typically an app on a smart phone would be used to control the process of downloading information. FIG. 7 shows the flash album device 60 in a folded mode without advertising thereon with the connector 70 extended. FIG. 8 shows the same but with the connector 70 stowed.

In support of the entertainment device 10, a method comprises the steps of obtaining from a selected artist video and audio data regarding the artist's work and placing the data on a portable storage device such as a memory stick for use in an entertainment frame. Although this is a preferred method, the data may also be downloaded onto a computer from a website supporting the present invention, placed on a memory stick and then inserted into the input port. That data is then uploaded into the entertainment device 10 for play. Or as noted above, the data would be placed on the device 72 as shown in FIG. 7 and the advertising 74 attached as noted above. FIG. 8 shows the flash album device 72 in a closed mode with advertising 74 thereon. This device 72 would replace conventional CDs and could be purchased online or from stores.

Figure 10:
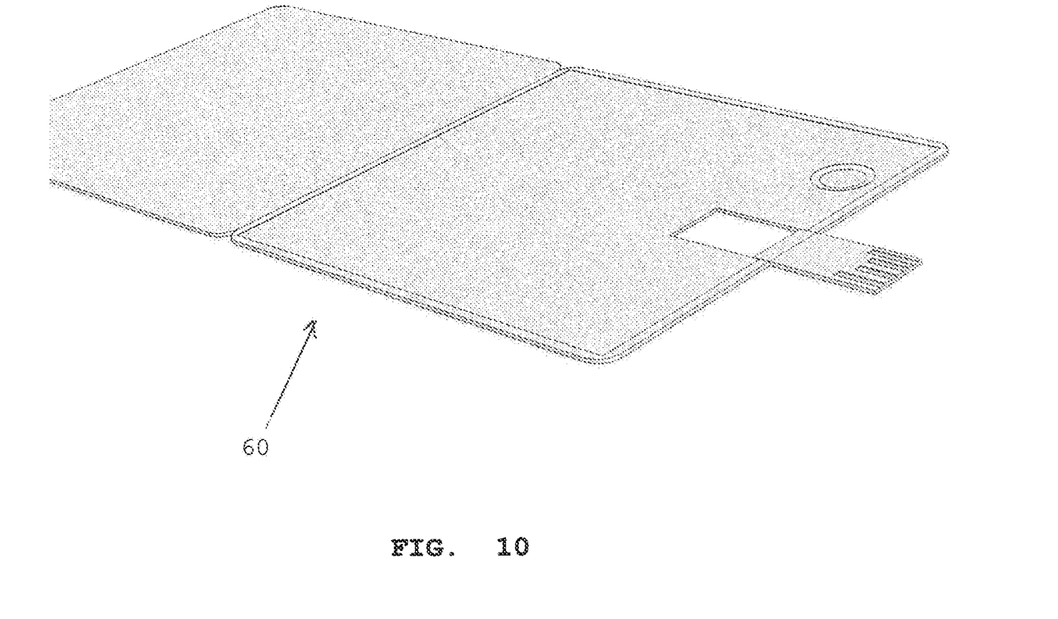
FIG. 10 is a perspective view of the flash album in an open mode showing also the connector rotated outward and a Bluetooth/On-Off switch of the present invention.
Figure 11:
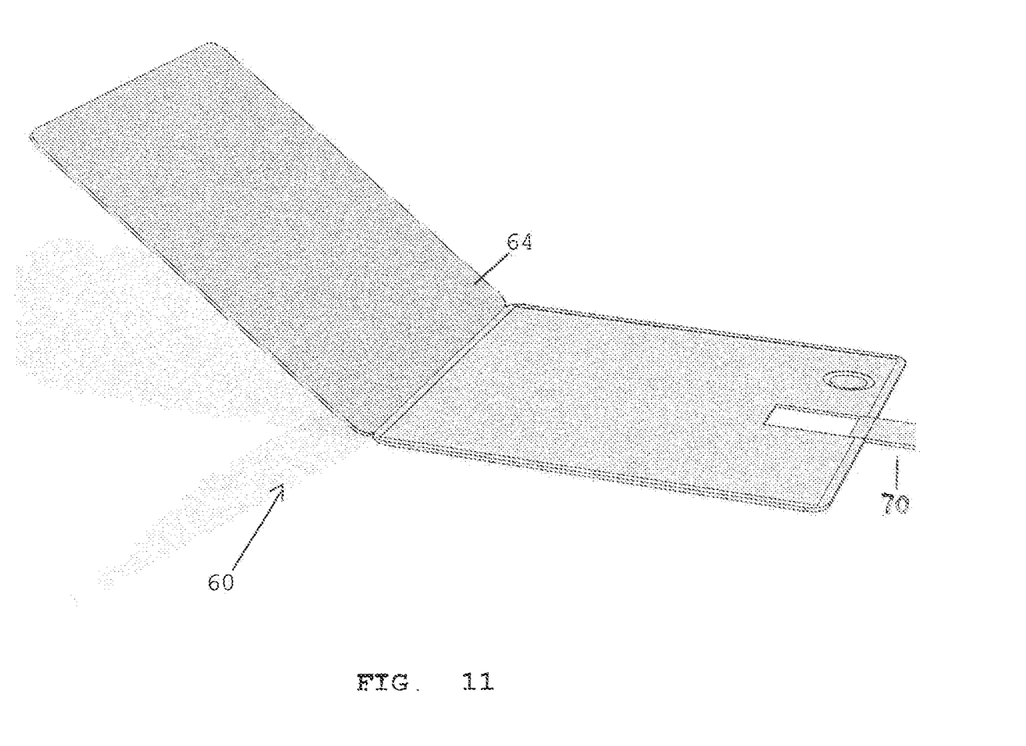
FIG. 11 is a different perspective view than FIG. 10 of the present invention.

In the present embodiment, FIG. 6 shows some exemplary dimensions as well as showing the lid 64 being hinged open from a base 66. An on-off button 68 is shown on the inside of the device 60 on the base 66. Additional information such as pictures and operating instructions, etc., can be included inside of the device 60. FIG. 10 shows the device 60 in a open mode. FIG. 11 shows the device 60 in a partially closed mode.

Figure 12:
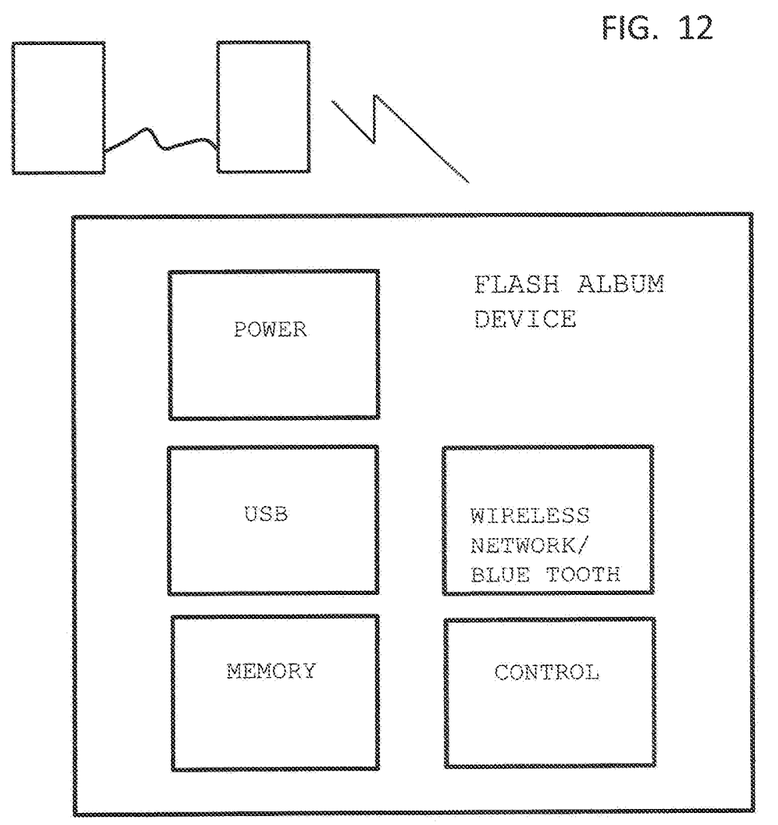
FIG. 12 is a schematic illustration of electronic features of the flash album device of the present invention.

FIG. 12 is a schematic of various operating features which would be connected together as would be well known to one skilled in the art knowing of the present invention. These features would be mounted inside of the base. The present invention includes a container being like a CD-case, having the lid 64 that is hinged to base 66 together. A USB device includes the port for communicating information to and/or from another entertainment device. Additionally, the device 10 would include a wireless network able to communicate to entertainment devices also having a wireless network therein. The music is preloaded on the USB drive which is built into the Flash Album or device. The music can play 2 ways: It can play via direct connection of the USB flash drive connected to a music port and or via pushing the button which activates any Bluetooth speaker device such in a stereo, car or any other means of music being played via Bluetooth and or USB activation. Speakers that are wireless enable may be included. A source of power being DC, for example, would be batteries that are rechargeable within the container. A wireless rechargeable device may be included to reduce external connections. The data is held within a flash memory device where the data would include information being video and music. Articles in Wikipedia regarding the Bluetooth device, the USB device 122, and the flash drive device are incorporated herein as of the filing date.

The present invention provides a method of entertainment to others of an artist's, painter's, or singer's works whether visual and/or audible. The work is downloaded from a source onto a flash album device. The flash album device may act as a stand-alone entertainment device itself since it has a Bluetooth connection to, for example, speakers. Then this downloaded work on the flash album device may then be downloaded a second time to an entertainment device with full visual and audio features or to another device such as a stand-alone modular device. The user acting through controllers is able to play and/or watch the work.

Therefore the present invention provides a video and audio flash album device comprising: a container, said container being about the size of a CD-case, having a folding lid on a base section; a connector for communicating information to and/or from another device, said connector operably connected to said base section; a wireless network, said wireless network able to communicate to said flash album device also having a wireless network therein having an on-off switch; a chargeable source of power within said container; a memory for information being video and music in said container; and a controller for operating said flash album device. The connector may be a USB connector. The USB connector is hinged or slidably mounted to said container wherein said connector does not interfere with opening or closing or carrying said device when said USB connector is placed in a closed mode. The wireless network is a Bluetooth network, for example. The memory in said flash drive device is a flash drive memory. The flash drive device includes a power on-off switch and/or a Bluetooth switch. A pair of speakers may be connected to the flash album device for receiving information from said flash album device. Wherein music and/or video on a flash drive memory is played via the USB port, flash album drive of the same device, or to a Bluetooth device when the on-off switch is activated. A smart phone acting through an app may operate said flash album device and/or an entertainment device. The flash album device may be connected to an entertainment device for providing coordinated video and audio of selected artists comprises: a picture frame, said picture frame being able to be mounted on a surface wherein said picture frame is separable and having frame connectors for inserting a removable single picture; a means for displaying imagery in said picture frame such means for displaying being at least one picture, or two or more pictures or movies as a video and being mounted within said picture frame, wherein said means for displaying is a display screen, said means for displaying comprising: an input device, said input device having video and audio data provided by a selected artist that is selected by a user, further including information from said selected artist that is coordinated by said artist as related to both the video and audio, wherein said information from one or more selected artists is obtained from a website, from an app in a smart device, and from a memory stick or from said flash album device; a source of rechargeable power for said means for displaying; an output device for displaying data from said video and audio data; and a controller in said frame having therein a microprocessor for controlling said input and output devices. Also, a separate entertainment device that can communicate to said entertainment device either by a USB port or over a wireless network. The flash album device includes printed information from said selected artist within and/or upon said container. The display screen provides functions and displays equivalent to a flat screen TV.

The present invention also provides a method used in an entertainment device capable of displaying and playing artist's work selected by a user. The method comprises downloading the work from a source onto a flash album device and playing said work as determined; downloading the work a second time to an entertainment device and/or a modular device and playing the work as determined. The CD-like device will have printed out advertising information thereon. The source will provide a selection of works from different artists, painters, and singers. Apps will be available in smart phones for control downloading and playing said works.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A video and audio flash album device, said flash album device comprising: a container, said container being about the size of a CD-case, having a folding lid on a base section; a connector for communicating information to and/or from another device, said connector operably connected to said base section; a wireless network, wireless network able to communicate to said flash album device also having a wireless network therein having an on-off switch; a chargeable source of power Within said container; a memory for information being video and music in said container; and a controller for operating said flash album device; and an entertainment device for providing coordinated video and audio of selected artists comprises: a picture frame, said picture frame being able to be mounted on a vertical or a horizontal surface, wherein said picture frame is separable and having frame connectors for inserting a removable single picture; a means for displaying imagery in said picture frame such means for displaying being at least one picture, or two or more pictures or movies as a video and being mounted within said picture frame, wherein said means for displaying is a display screen, said means for displaying comprising, an input device, said input device having video and audio data provided by a selected artist that is selected by a user, further including information from said selected artist that is coordinated by said artist as related to both the video and audio, wherein said information from one or more selected artists is obtained from a website, from an app in a smart device, and from a memory stick or from said flash album device; a source of rechargeable power for said means for displaying; an output device for displaying data from said video and audio data; and a controller in said frame having therein a microprocessor for controlling said input and output devices.

2. The flash album device as defined in claim 1, further including a USB connector of said connector for connecting to another device.

3. The flash album device as defined in claim 2, wherein said USB connector is hinged or slidably mounted to said container wherein said connector does not interfere with opening or closing or carrying said device when said USB connector is placed in a closed mode.

4. The flash drive device as defined in claim 1, wherein said wireless network is a Bluetooth network.

5. The flash drive device as defined in claim 1 wherein said memory is a flash drive memory.

6. The flash drive device as defined in claim 1, said container further including a power on-off switch and/or a Bluetooth switch.

7. The flash drive device as defined in claim 1, further including speakers being on said wireless network for receiving information from said flash album device.

8. The flash album device as defined in claim 1, wherein music and/or video on a flash drive memory is played via the USB port, flash album drive of the same device, or to a Bluetooth device when the on-off switch is activated.

9. The flash album device as defined in claim 8, further including Bluetooth connected speakers.

10. The flash album as defined in claim 1, further including a separate entertainment device that can communicate to said entertainment device either by a USB port or over a wireless network.

11. The flash album device as defined in claim 1, further including printed information from said selected artist within and/or upon said container.

12. The entertainment device as defined in claim 11, wherein said selected artist is either a singer or painter.

13. The entertainment device as defined in claim 1, wherein said display screen provides functions and displays equivalent to a flat screen TV.

\* \* \* \* \*